US007555355B2

(12) United States Patent
Meyer

(10) Patent No.: US 7,555,355 B2
(45) Date of Patent: Jun. 30, 2009

(54) MODELING PRODUCTION PROCESSES USING REUSABLE DEFINED MANUFACTURING SEGMENTS

(75) Inventor: Petra Meyer, Walldorf (DE)

(73) Assignee: SAP AG, Walldorf (DE)

( * ) Notice: Subject to any disclaimer, the term of this patent is extended or adjusted under 35 U.S.C. 154(b) by 148 days.

(21) Appl. No.: 11/364,269

(22) Filed: Feb. 28, 2006

(65) Prior Publication Data
US 2007/0203602 A1    Aug. 30, 2007

(51) Int. Cl.
*G06F 19/00* (2006.01)
(52) U.S. Cl. .......................................... 700/97; 700/107
(58) Field of Classification Search ........... 700/97–201; 705/8, 10
See application file for complete search history.

(56) References Cited

U.S. PATENT DOCUMENTS

| | | | | |
|---|---|---|---|---|
| 5,089,970 | A * | 2/1992 | Lee et al. ....................... | 700/96 |
| 6,546,300 | B1 * | 4/2003 | Fukuda et al. ................. | 700/100 |
| 2003/0229550 | A1 * | 12/2003 | DiPrima et al. ............... | 705/28 |
| 2004/0019604 | A1 * | 1/2004 | Ballas et al. ................... | 707/104.1 |
| 2007/0050070 | A1 * | 3/2007 | Strain et al. .................... | 700/99 |

OTHER PUBLICATIONS

"Microsoft Navision 4.0" [online]. [retrieved on Feb. 28, 2006]. Retrieved from the Internet: URL: http://www.amazon.com/gp/product/3528059257/qid=1141163754/sr=2-1/ref=pd_bbs_b_2_1/104-9677270-6535155?s=books&v=glance&n=283155, 5 pages.
"Digital 3D Manufacturing Solutions" [online]. 2002. [retrieved on Feb. 28, 2006]. Retrieved from the Internet: URL: http://www.delmia.com/, 1 page.

* cited by examiner

*Primary Examiner*—Kidest Bahta
(74) *Attorney, Agent, or Firm*—Fish & Richardson P.C.

(57) ABSTRACT

A manufacturing production and process electronic data model and method of defining the model are provided, in which the model defines the manufacturing of a defined end output product. The electronic data model includes, firstly, a top-level database object that identifies the defined end output product. The electronic data model also includes multiple defined production segment database objects that are each linked to the top-level database object. Each linked production segment database object 1) identifies a defined segment output product, 2) includes a defined bill of material needed as inputs to produce the defined segment output product, and 3) includes a defined routing that describes how the defined segment output product is produced. One of the defined segment output products is the defined end output product.

20 Claims, 8 Drawing Sheets

MODELING PRODUCTION PROCESSES USING REUSABLE DEFINED MANUFACTURING SEGMENTS

TECHNICAL FIELD

This document relates to modeling manufacturing production processes.

BACKGROUND

A manufacturing planning and execution computing system may be used in a manufacturing environment that produces products according to a demand for those products. Such a system may be able to control and track the operation of the manufacturing process, and uses predefined manufacturing process master data that typically is made up of many defined execution operations and activities. Each of the separate execution activity definitions may include, for example, what the inputs to the operation are, what machinery (or resource) must, or may, be used in the operation, and what the output of the operation is. This predefined master data also typically defines a process flow, or linkage, between each of the individual manufacturing operations and activities. This process flow may be referred to as a routing. During execution of the system, the system controls and tracks each of the operations in the overall process.

The manufacturing process master data and routing definitions are, in a typical case, defined by a process designer or engineer. The master data and routing definitions typically define each of the operations of the manufacturing process in detail, and how each of the operations relates to other operations. The manufacturing master data and routing definitions are generally defined up front, before the manufacturing process is ever run, and are generally not changed very frequently. In other words, the master data and routing definitions are not intended to be changed on a day-to-day basis, but rather are set up at the beginning to achieve an efficiently operating manufacturing entity.

In many cases, there may be a portion of a production process, which may be referred to as segment, that is used in multiple different manufacturing processes that produce different products, but where in each of the different manufacturing processes the same manufacturing segment is executed in the same manner and produces the same intermediate product. In addition, there are manufacturing processes used to produce the same product in different manufacturing facilities may be different from one another, although some parts of the process may be performed in exactly the same way and produce exactly the same intermediate product. The job of creating and maintaining manufacturing master data that defines a manufacturing process for a particular end product may be a time-consuming process, especially in a case where product designs may change very quickly.

SUMMARY

Generally, this document describes a manufacturing production and process electronic data model that defines a manufacturing process for a defined output product in two levels to facilitate the reusability of lower-level defined manufacturing segments.

In particular, this document describes a manufacturing production and process electronic data model that is tangibly embodied in an electronic information carrier. The electronic data model defines the manufacturing of a defined end output product, and includes, firstly, a top-level database object that identifies the defined end output product. The electronic data model also includes multiple defined production segment database objects that are each linked to the top-level database object. Each linked production segment database object 1) identifies a defined segment output product, 2) includes a defined bill of material needed as inputs to produce the defined segment output product, and 3) includes a defined routing that describes how the defined segment output product is produced. One of the defined segment output products is the defined end output product.

Various implementations of the electronic data model may include one or more of the following features. For each defined production segment that is not the one segment for which the defined segment output product is the defined end output product, the defined segment output product may be an intermediate product used in a subsequent linked defined production segment. Each defined production segment database object may correspond to production tasks for which a separate production order is generated for execution.

In addition, each of the defined bills of material may include at least one of a defined material item and a defined group of material items. Each defined process routing may include at least one defined production activity. The production segment database object may include a defined link between an item or item group and a routing activity to define the linked item or item group as an input for the routing activity to which the item or item group is linked.

Also, the electronic data model may be used to generate a production data structure having a form that allows a production order to be generated from the production data structure. The production data structure may be an aggregated structure from which a production order is generated that is used for planning the production of a specified quantity of the end output product. In addition, the production data structure may be a structure from which a production order is generated that is used for executing production of a specified quantity of the end output product. In addition, both such production data structures may be generated from the same electronic data model.

In another aspect, this document describes a computer-implemented method for defining a manufacturing production and process electronic data model that defines the manufacturing of a defined end output product. The method includes defining a top-level database object that identifies the defined end output product and a production organization responsible for manufacturing the defined end output product. The method also includes assigning to the top-level database object multiple defined production segment database objects. Each segment database object identifies a defined segment output product, and includes 1) a defined bill of material needed as inputs to produce the segment output product, and 2) a defined process routing that describes how the segment output product is produced.

Various implementations of the method may include one or more of the following features. The assigning of multiple defined production segment database objects may includes both assigning to the top-level database object a first defined production segment database object that has a defined segment output product that is the same as the end output product, and assigning to the top-level database object a second defined production segment that has a defined segment output product that is the same as an item defined in the bill of material for the first defined production segment database object. The assigning of multiple defined production segment database objects may further include assigning to the top-level database object a third defined production segment that has a defined segment output product that is the same as an item defined in the bill of material for the second defined production segment database object. The method may further include continuing the assignment of additional defined production segment database objects that have a defined segment output product that is the same as an item defined in the bill of material for an already assigned production segment database object.

In addition, the electronic data model defined in the method may include any of the other features of the model described above or in the following description. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
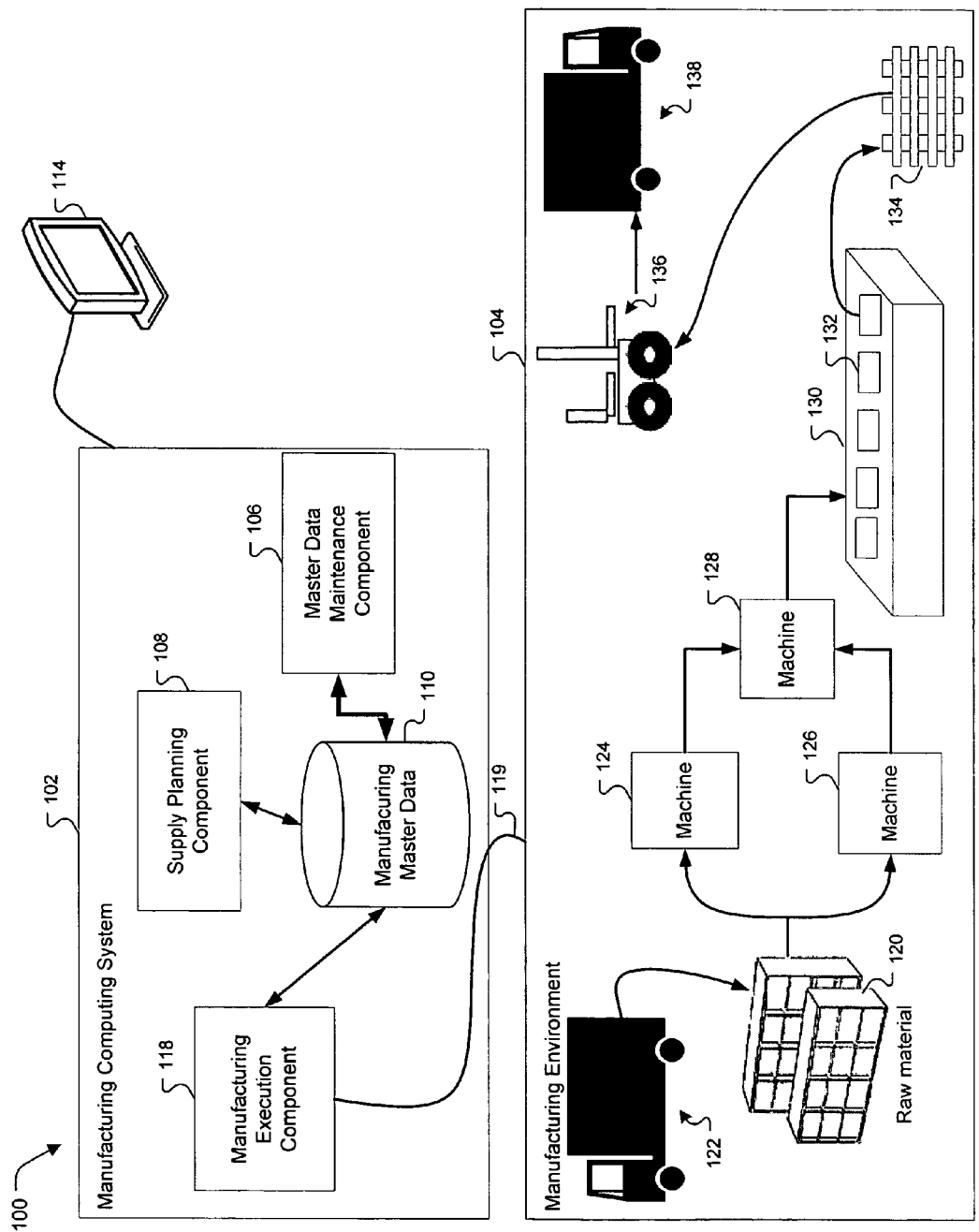
FIGS. 1A and 1B are block diagrams of an example manufacturing system in which an integrated production process model is defined and used.

FIG. 1A shows an example manufacturing or production entity 100, which will be generally described in this document to lay a foundation for understanding the integrated planning and production electronic database model and methods that will be described later in this document. The example manufacturing or production entity 100 shown in FIG. 1A includes a manufacturing planning and execution computing system 102 and a manufacturing environment 104, which may be, for example, a manufacturing shop floor. The manufacturing entity 100 may be any type of facility or manufacturing plant—or multiple facilities or plants under control of a distributed computing system—that manufactures any type of product and supplies product to customers. A user station 114 is shown in FIG. 1A to illustrate generally that there may be user interaction with the various computing components of the manufacturing computing system 102.

The manufacturing planning and execution computing system 102 of FIG. 1A has a supply planning component 108 and a manufacturing execution component 118. The supply planning component 108, which also may be referred to as a manufacturing planning component, is a tool that a user may employ to plan how the manufacturing environment 104 can be operated to achieve a supply of end products that meets a specified demand. The planning component 108 receives, for example, demand information, which may, for example, be in the form of a customer order that the manufacturing entity 100 supply a specified number of product within a specified timeframe, or the demand information be internally generated by the supplier, or manufacturer based on a forecast. The planning component 108 produces planning production orders, which may be used in the generation of an execution order, which is used by the execution component 118 in executing the manufacturing process to meet the demand input.

The manufacturing execution component 118 is the "execution" portion of the manufacturing planning and execution system 102. The execution component 118 operates to control and track the execution of the manufacturing process carried out by the manufacturing environment 104 in accordance with execution production orders. As such, FIG. 1A shows that there is an interface 119 between the manufacturing execution module 118 and the manufacturing environment 104, which interface 119 serves to integrate the computing system 102 with the manufacturing environment 104, or shop floor. For example, the interface 119 allows the computing system 102 to provide instructions that control when and where materials and resources will be used in the manufacturing environment 104, as well as the ability of the computing system 102 to receive input from the manufacturing environment 104, for example, confirming that a certain manufacturing operation has been completed.

The manufacturing planning and execution computing system 102 includes predefined manufacturing process master data, shown in FIG. 1A as stored in repository 110. In one implementation, the repository 110 shown in FIG. 1A contains several types of manufacturing master data, and the repository 110 is actually a collection of separate master data repositories that may be separately stored in connection with components that use the master data. As will be described later, the master data includes a collection of different defined integrated production process models for different products, and other master data related to those models.

In addition, the master data may also include what may be referred to as production data structures that are each generated from an integrated production process model and that are in a format that can be used to generate a planning production order to produce a particular demand quantity of product. In addition, there may be different production data structures needed, for example, one to create execution-level production orders by the manufacturing execution component 118, and one to create planning-level production orders by the supply planning component 108. In one implementation, for any particular defined manufacturing process that is modeled with an integrated production process model, a planning production data structure would be less detailed than a execution production data structure.

A master data maintenance component 106 is shown in FIG. 1A as included in the manufacturing computing system 102. The master data maintenance component 106 may be used, for example, to create and maintain the master data stored in repository 110. While the master data maintenance component 106 is shown in the FIG. 1A example as being a component of the manufacturing system 102, it may alternatively be a general component that may be used with the manufacturing computing system 102 as well as other computing systems within an enterprise. In addition, the master data maintenance component 106 may be in part a component with general applicability and a component that has particular applicability to manufacturing master data, as with the case of the integrated production process model described in this document.

The production environment 104 shown in FIG. 1A is a simplified example of a complete manufacturing process to produce a product from beginning to end. The process in this example includes both production (making) and logistics (moving) functions. The process begins with the delivery of raw material from a truck 122. The raw material is shown being stored in a storage area 120. From there, the raw material may be processed by one of two alternative machines 124 and 126. The output of both machines 124 and 126 feeds into another machine 128. The output of machine 128 feeds into a transport process, such as a conveyor system 130, that delivers the output products 132 of machine 128 to an output staging area where the output product 132 is loaded onto pallets 134. There may also be a packing operation to package the output products 132 before they are loaded onto pallets. A forklift 136 is then used to load pallets of finished and packaged product into a truck 138 for final delivery. It will be appreciated that the FIG. 1A example is a simplified high-level depiction of a manufacturing environment 104 for illustration purposes only, and that an actual environment may be much more complex and involve many more execution operations.

The execution component 118 performs execution and control functions on the manufacturing environment 104 according to the generated execution order 120. For example, the execution component 118 may instruct the manufacturing environment 104 to execute the operations or the sub-activities. Upon receiving the instructions, the manufacturing environment 104 may execute the received instructions and report status of the production floor 104 to the execution component 118.

The computing system 102 may generate various different user interface views to assist both the planning component 108 and the execution component 118. The system 102 may generate a planning board and various execution information screens, for example. The planning board may provide a visual display of the process flow using planning operations, as defined by markers selected by a user, as separate blocks of the overall process flow. The planning board may be used during a planning function, and the execution screens may be used in an execution function.

Figure 1B:
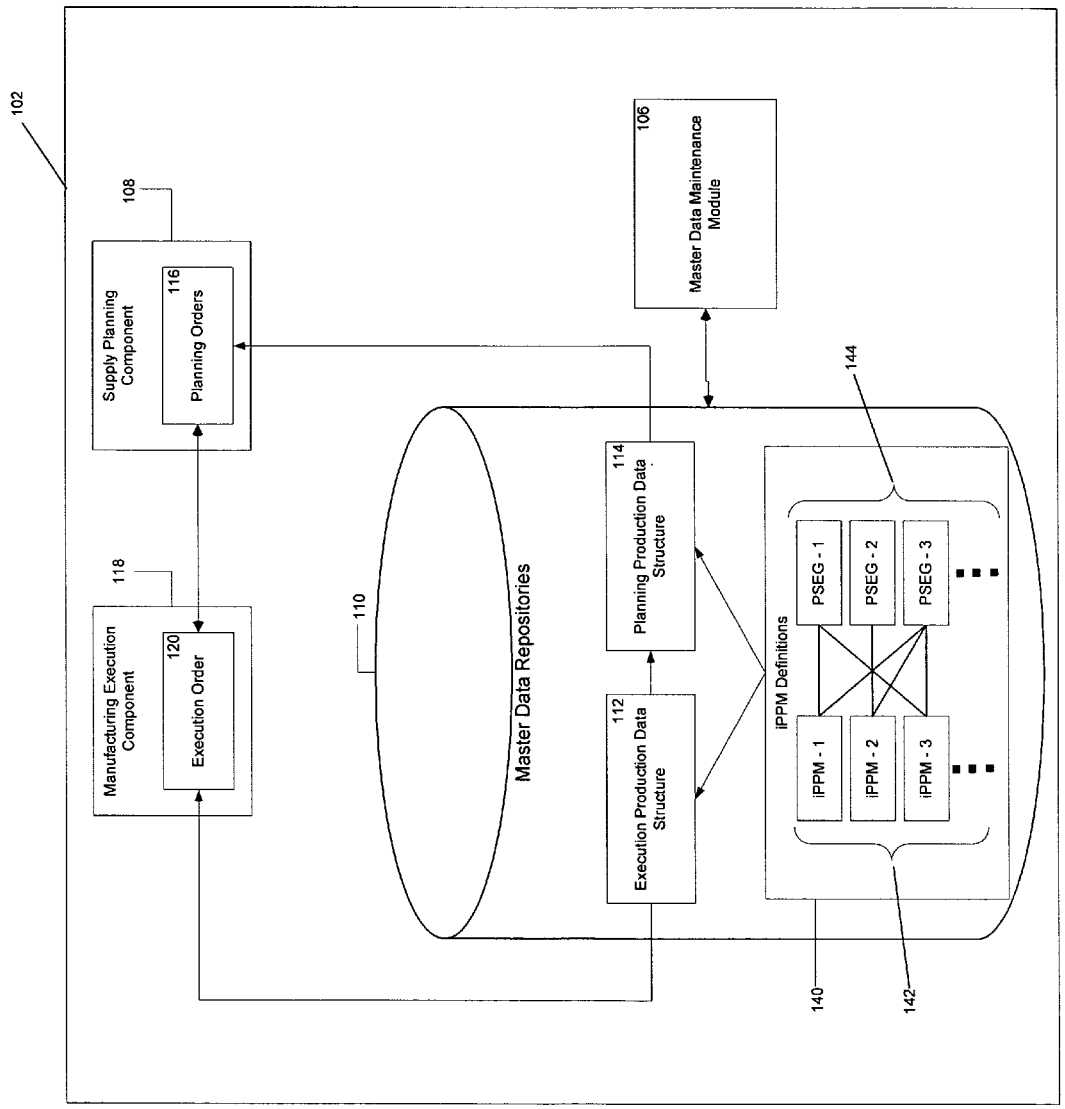

FIG. 1B shows a more detailed view of an example manufacturing computing system 102 shown in FIG. 1A. Many of the components shown in FIG. 1B have already been described in connection with FIG. 1A. The master data repository 110 is shown as including a repository 140 of multiple integrated production process model (iPPM) definitions. Various defined iPPM database objects 142 (iPPM-1, iPPM-2, iPPM-3, etc.) are shown, as well as various defined production segment database objects 144 (PSEG-1, PSEG-2, PSEG-3, etc.). Generally, a separate iPPM database object exists for every defined end product that may be manufactured. A production segment database object may, for example, combine a defined process routing a bill of materials, as will be shown later in this document. Several production segments can be grouped together in an iPPM database object, although in one implementation each production segment is used to create a separate execution production order.

As shown in the figure, various different defined production segment database objects may be assigned to a particular integrated production process model database object. For example, model iPPM-1 has PSEG-1 and PSEG-3 assigned to it, model iPPM-2 has PSEG-2 and PSEG-3 assigned to it, and model iPPM-3 has PSEG-1 and PSEG-3 assigned to it. Thus it can be seen that a single defined production segment database object may be assigned to multiple different iPPM database objects.

As shown by the arrows above the iPPM definitions repository 140, the iPPM definitions may be used to generate, for each iPPM database object, an execution-level production data structure (which also may be considered master data), which is shown stored in repository 112 of the master data repositories 110. This execution-level production data structure may, for example, be used to generate and schedule an execution production order for the production of a certain defined quantity of product. As such, the execution-level production data structure may have a format necessary to generate such an order. The generated execution-level production order may be stored in repository 120 of the manufacturing execution component 118.

In addition, the iPPM definitions stored in repository 140 may be used to generate a planning-level production data structure, which is shown stored in repository 114 of the master data repositories 110. This planning-level production data structure may, in turn, be used to generate and schedule a planning-level production order for the production of a certain defined quantity of product. This planning-level production order may be stored in repository 116 of the supply planning component 118.

As discussed previously, the planning production orders and execution production orders may have different levels of detail, with the execution production orders typically being more detailed. A planned production order may be released for execution at some point in time after the planned production order is originally created. At that time, an execution production order that is more detailed may be generated from the planned production order. Holding planned production orders from release before a point in time that execution is about to begin allows planned orders to be taken into account more easily when new production demands are received.

Figure 2:
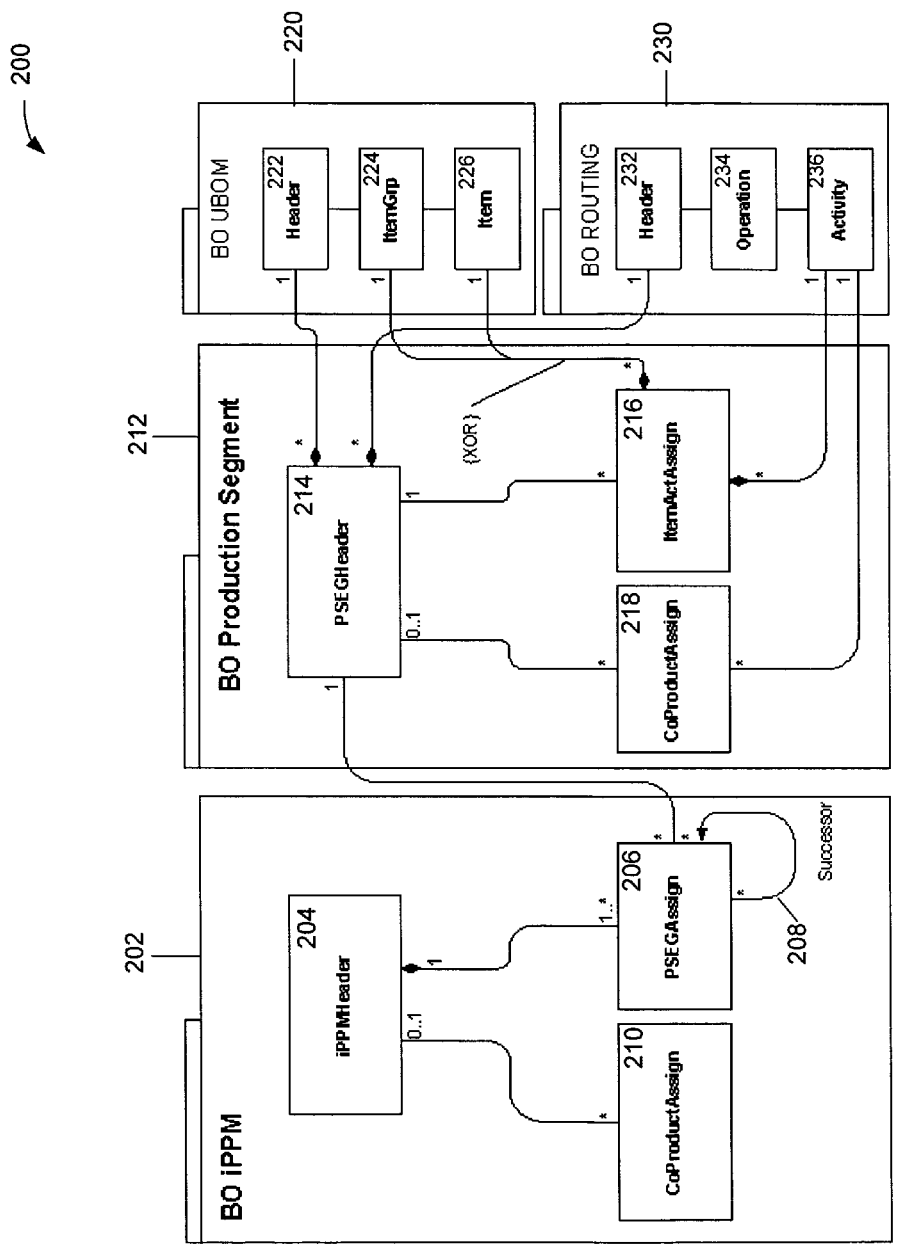
FIG. 2 is a data model for example database objects that are part of an example integrated production process model.

FIG. 2 illustrates a simplified preview of an example data model 200 that includes the database objects (also referred to as "business objects," or "BO's") of the iPPM and PSEG shown in FIG. 1B. The iPPM database object 202 includes a header 204 that includes, among other possible things, an identifier for a defined end product to which the iPPM relates. The iPPM database object 202 also includes a PSEG assignment structure 206 that identifies all of the production segments that are assigned to the iPPM. As discussed already, there may be multiple PSEG's assigned to a single iPPM, although only one such PSEG is shown in FIG. 2. An arrow 208 labeled "successor" is recursively shown in connection with the PSEG assignment structure 206, which illustrates that each of the assigned PSEG's, except the assigned PSEG that is a final segment of a production process, produces an intermediate product that is used by a later PSEG. This will be explained in further detail later.

The iPPM database object 202 also includes an assigned "co-product"—that is "coupled" product(s)—structure 210. A coupled product may be an intermediate product, or a by-product, that is produced during the course of producing the defined end product, and where it may be desirable for that co-product to be taken into account in generating the production data structure. In this case, the coupled product is assigned to the iPPM header 204.

Next, one of the assigned production segment (PSEG) database objects 212 is shown in FIG. 2. The PSEG database object 212 includes a header 214 that includes, among other possible things, an identifier for a defined segment end product to which the PSEG relates. The PSEG database object 212 also includes an item/activity assignment structure 216. Generally, this assigns an item from a bill of material as an input to a manufacturing activity from a routing, as will be explained in more detail later. There may be multiple such assignments for any one PSEG database object. As with the iPPM database object 202, the PSEG database object also includes an assigned "co-product"—that is "coupled" product(s)—structure 218. In this context, a coupled product may be an intermediate product, or a by-product, that is produced during the course of producing the defined segment end product, and where it may be desirable for that co-product to be taken into account in generating the production data structure. In this case, the coupled product is assigned to the PSEG header 214.

The production segment database object 212 in the FIG. 2 example is made up of a bill of material database object 220 (which in this example is a "universal" bill of material database object), and a process routing database object 230. The BOM database object includes a header 222, which identifies the final product of the bill of material. The end product identified in the header 222 of the BOM database object 220 should be the product identified in the PSEG header 214, as indicated by the line connecting the two structures. The BOM database object also includes a hierarchical definition of the material that make up the end product identified in the BOM object header 222. Under the header 222 there are item groups 224 and under the item groups 224 are items 226.

The routing database object 230 includes a header 232, which identifies the final product of the bill of material. The end product identified in the header 232 of the routing database object 230 should be the product identified in the PSEG header 214, as indicated by the line connecting the two structures. The routing database object 230 also includes, among other more detailed information, defined manufacturing operations 234 that are included in the routing, as well as defined activities 236 that make up the manufacturing operations 234.

As mentioned briefly, the PSEG item/activity assignment structure 216 that assigns an item from a bill of material as an input to a manufacturing activity from a routing. As can be seen in FIG. 2, both item groups 224 and items 226 may be assigned, and these materials are assigned to particular activities 236 of the routing database object 230.

Figure 3:
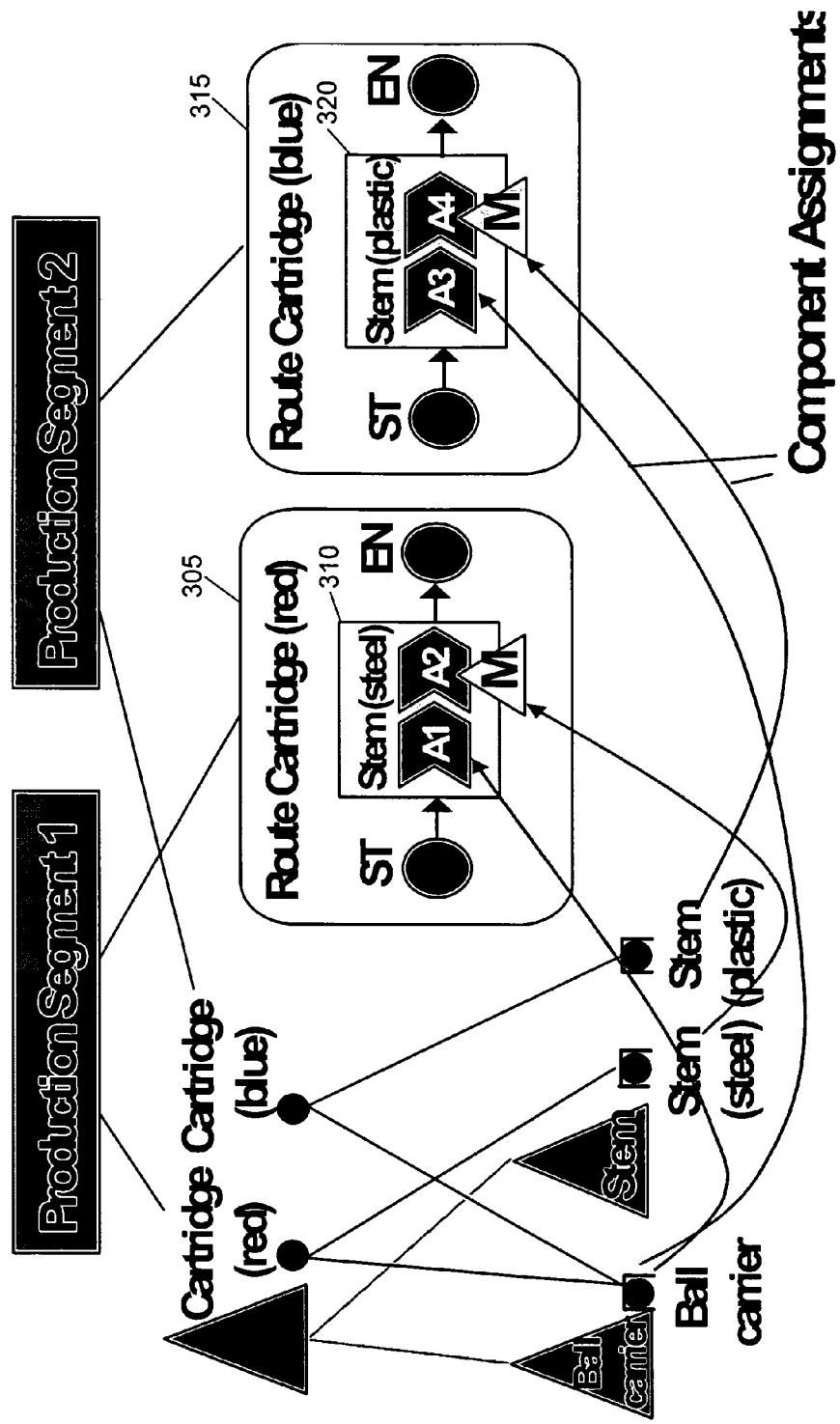
FIG. 3 is a depiction of multiple defined production segments.

Referring now to FIG. 3, there is shown a pictorial representation of two defined production segments, production segment 1 and production segment 2. Each production segment has an assigned bill of material (shown on the left side of the figure) and an assigned routing (shown on the right side of the figure). In particular, the production segment 1 has a first defined routing 305 assigned to it, which is a routing for producing a cartridge that is colored red. The routing 305 includes a start marker ST that defines the start of the routing and an end marker EN that defines the end of the routing. The first routing 305 includes one production operation 310 that is made up of two sequential production activities A1 and A2. The bill of material for the production segment 1 (for a red cartridge) includes, as shown on the left side of the figure, a ball carrier and a stem that is steel. As shown in the figure, the steel stem of the bill of material is an input M to the activity A2 of the first routing 305. This may be modeled, for example, using the item/activity assignment structure 216 shown in FIG. 2.

The production segment 2 has a second defined routing 315 assigned to it, which is a routing for producing a cartridge that is colored blue. The routing 315 includes a start marker ST that defines the start of the routing and an end marker EN that defines the end of the routing. The second routing 315 includes one production operation 320 that is made up of two sequential production activities A3 and A4. The bill of material for the production segment 2 (for a blue cartridge) includes, as shown on the left side of the figure, a ball carrier (the same ball carrier as used in the bill of material for the red cartridge) and a stem that is plastic instead of the steel stem used in the red cartridge. As shown in the figure, the plastic stem of the bill of material is an input M to the activity A4 of the second routing 315. Again, this may be modeled, for example, using the item/activity assignment structure 216 shown in FIG. 2.

Figure 4:
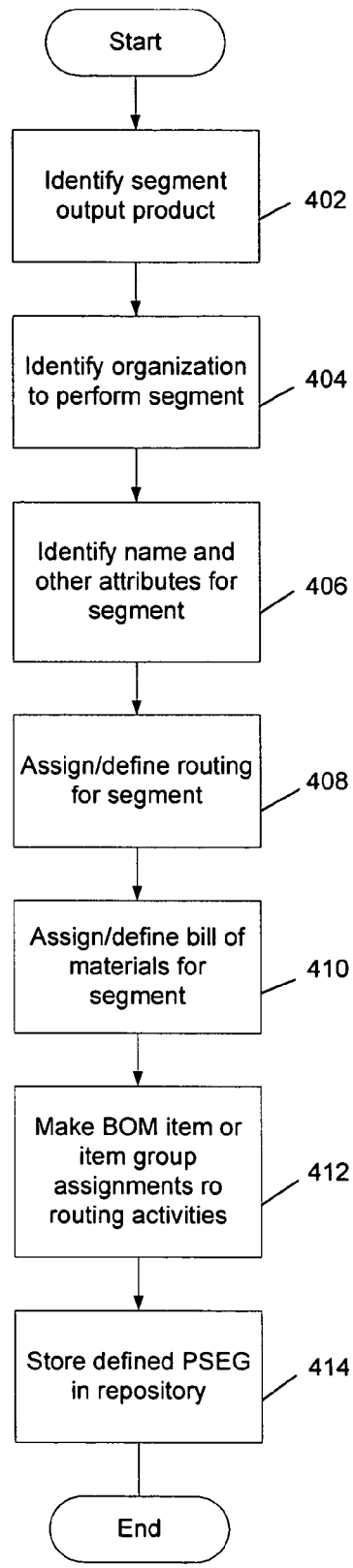
FIG. 4 is a flowchart showing a method of defining a production segment, such as a segment of the type illustrated in FIG. 3.

FIG. 4 shows an example computer-implemented method for defining a production segment database object. The method shows the operations that are performed, for example, by a master data maintenance computing component such as component 106 of the system of FIGS. 1A and 1B. A user may interact with the computing component 106 using a client device, such as device 114 shown in FIG. 1A. Although one order of steps is shown in FIG. 4, it will be appreciated that the steps may be performed in different orders.

The method begins, in this example, with step 402 where a segment output product is identified that is produced in the production segment being defined. For example, this information may be part of a header structure, for example, header 214 of the FIG. 2 example. Next, at step 404, an organization is defined for the production segment. For example, it may be that a defined product may be produced differently in two different manufacturing facilities, and so the organizational identifier may identify the facility to which the segment pertains. At step 406 a name for the production segment is defined, as well as other attributes that may be used in various different implementations.

At step 408, a routing is either assigned or defined for the production segment. A routing may already exist that can be assigned, although in some cases the routing will need to be defined before it can be assigned to the production segment database object. Next, at step 410, a bill of material is either assigned or defined for the production segment. A bill of material may already exist that can be assigned, although in some cases the bill of material will need to be defined before it can be assigned to the production segment database object. Next, at step 412, assignment of bill of material items and item groups may be made to define input products for defined production activities of the routing assigned in step 408. This may be produce, for example, the item/activity assignment structure 216 shown in FIG. 2. Finally, at step 414, the defined PSEG database object is stored in a database repository, for example, so that it may be assigned to an iPPM database object as will be described later in this document.

Figure 5:
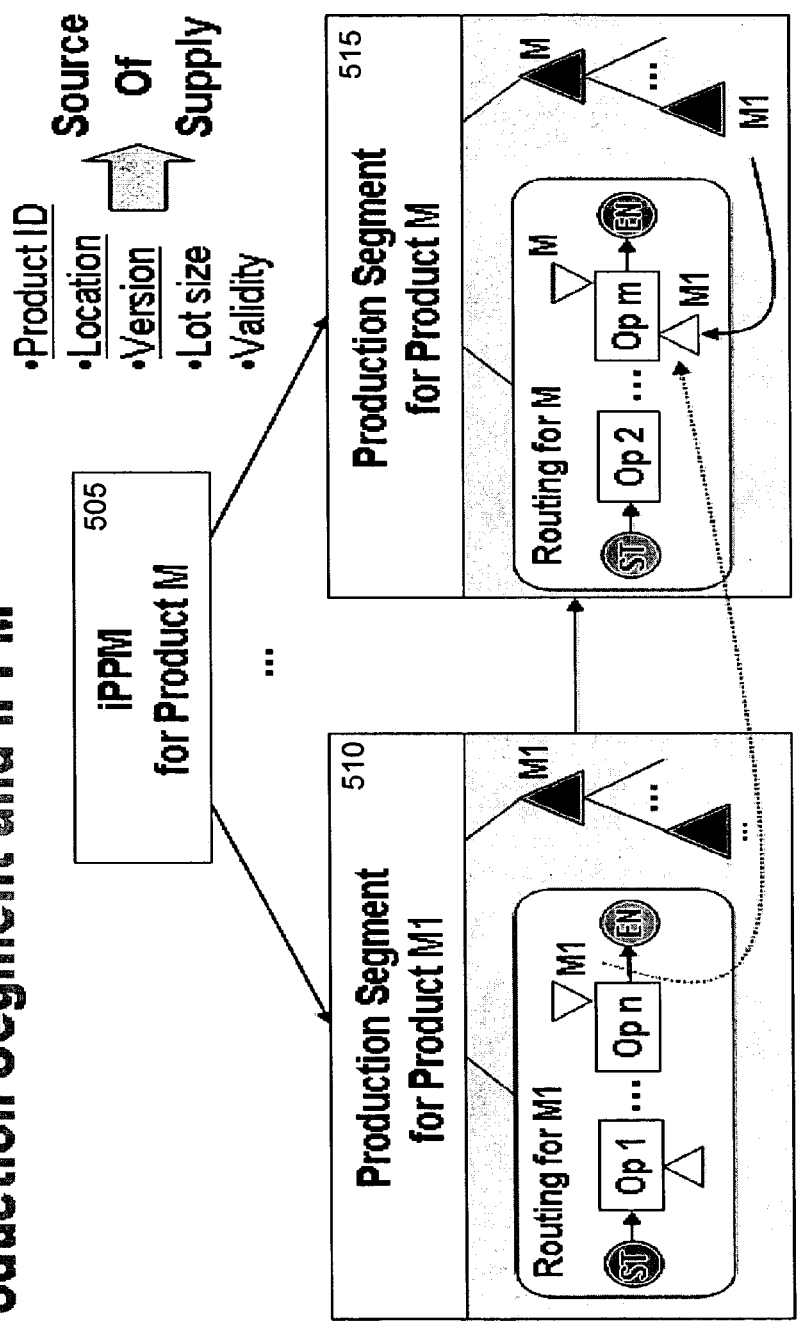
FIG. 5 is a depiction of an integrated production process model that includes multiple assigned production segments.

Referring now to FIG. 5, there is shown a pictorial representation of a defined integrated production process model (iPPM) database object for a product M. The iPPM database object in this example includes a header 505 and multiple production segment (PSEG) database objects assigned to the iPPM header 505. As indicated in the figure, there may be more than two assigned PSEG database objects, although only two are shown in FIG. 5 for clarity. The two PSEG database objects shown in FIG. 5 are a final PSEG database object 515 for a segment that produces the final end product M, and an earlier PSEG database object 510 for a segment that produces an intermediate product M1 that serves as an input product for a defined production activity within a routing for the PSEG database object 515 for the segment that produces the final end product M.

As with previously described implementations, the defined productions segments 510 and 515 each include a defined process routing a defined bill of material. The M1 production segment 510 includes a routing for the segment that produces M1 and a bill of material for M1, and the M production segment 515 includes a routing for the segment that produces M and a bill of material for M. The M1 segment routing includes a defined sequence of production operations starting with Op 1 and continuing through operation Op n, and the M segment routing includes a defined sequence of production operations starting with Op 2 and continuing through operation Op m. The segment output product M1 is produced by the operation Op n, and the segment output product M is produced by the operation Op m. The material M1 is assigned as an input to operation Op M, as shown in the figure. The bill of material for product M in the defined PSEG 515 is shown to include intermediate product M1.

FIG. 5 identifies various possible header attributes that may be defined for a header of an iPPM database object. In this example, the header 505 includes a product identifier (ID), which may be a global unique identifier for the final end product M. The header 505 also includes a location attribute. As discussed previously in connection with production segment database objects, different process may be used in different facilities, or locations, to produce the same product. As such, the location serves to identify the proper iPPM database object that applies for a given location. Next, the header 505 may have a version identifier, which identifies a version for the iPPM database object, a lot size which identifies a lot size (quantity of products) for which the iPPM database object applies. For example, it may be that different processes may be defined for large lot sizes than is defined for small lot sizes. Finally in this example, the header 505 includes a validity attribute, which may be a period of time during which the iPPM is defined to be valid. In general, the header attributes identify a particular source of supply, as indicated in the figure.

Figure 6:
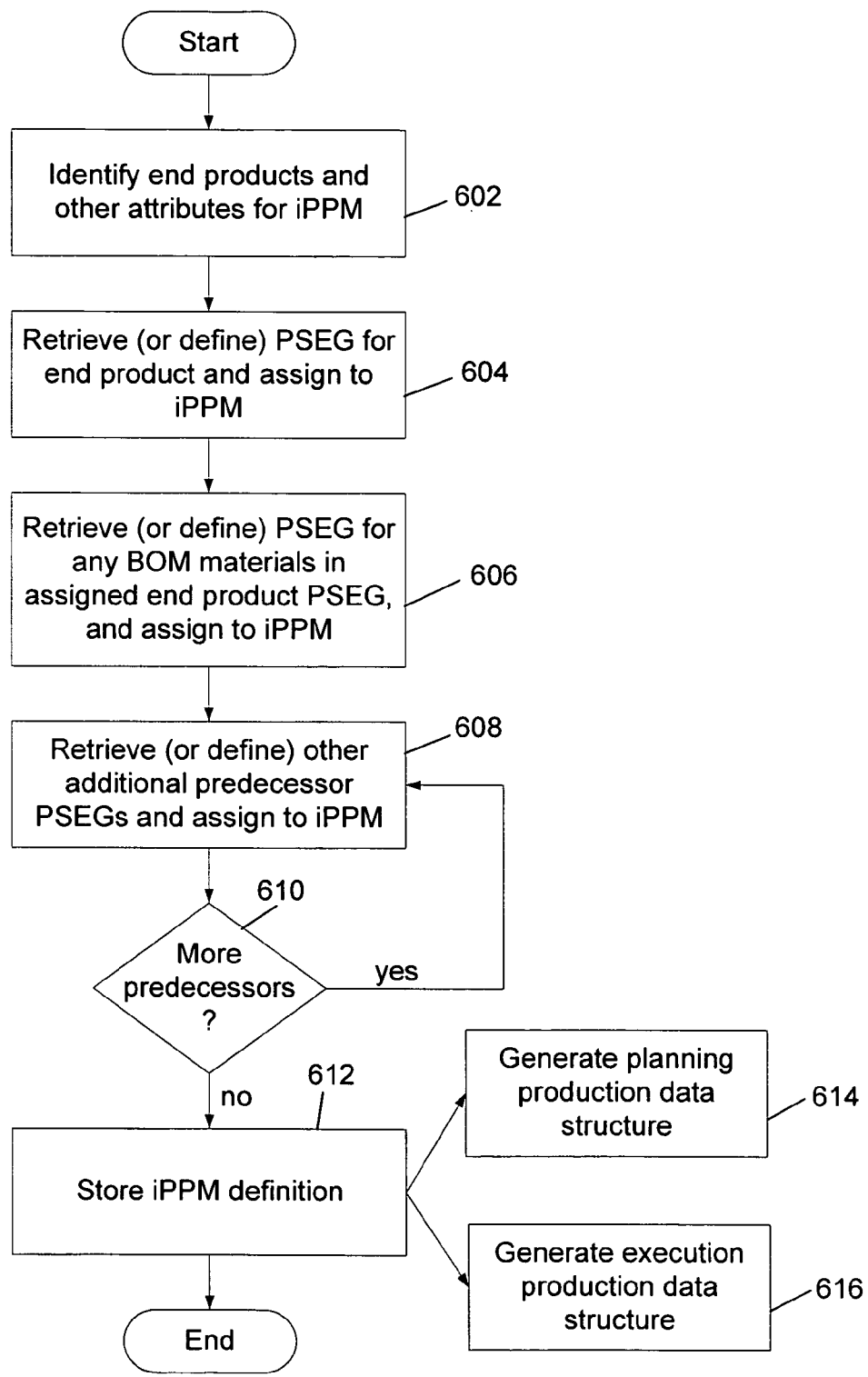
FIG. 6 is a flowchart showing a method of defining an integrated production process model, such as a model of the type illustrated in FIG. 5.

FIG. 6 shows an example computer-implemented method for defining an integrated production process model, or iPPM, database object. The method shows the operations that are performed, for example, by a master data maintenance computing component such as component 106 of the system of FIGS. 1A and 1B. A user may interact with the computing component 106 using a client device, such as device 114 shown in FIG. 1A. Although one order of steps is shown in FIG. 4, it will be appreciated that the steps may be performed in different orders.

The method begins, in this example, with step 602 where an end output product is identified that is produced in the production process being defined by the iPPM database object. For example, this end output product information may be part of a header structure, for example, header 204 of the FIG. 2 example. In addition with step 602, other header attributes may defined that more fully identify a particular source of supply, for example, the iPPM header attributes identified in FIG. 5.

Next, at step 604, a defined PSEG for a segment that produces the end product is assigned to the iPPM database object. In some cases, the PSEG may already have been defined, and the assignment may simply involve searching a repository of previously defined PSEG's, and assigning the previously defined PSEG to the iPPM database object. In cases where the PSEG database object has not been previously defined, it may be defined using, for example, a method such as that shown in FIG. 4. Next, at step 606, additional defined PSEG database objects are assigned (or defined and assigned) to the iPPM database object based on constituent input products identified in the bill of material for the PSEG assigned in step 604. For further illustration, reference may be made to FIG. 5, where the bill of material for end product M is shown to include intermediate product M1 as a constituent product. In the context of the FIG. 5 example, step 606 would involve assigning to the iPPM database object the production segment 510 for intermediate material M1. This PSEG may be referred to as a predecessor PSEG.

Next, in step 608, there is assigned an additional predecessor PSEG, if there are any, to the iPPM database object. The assigned PSEG in this step may be a predecessor because it is a segment that produces a constituent product that is part of the end product bill of material, or because it is a segment that produces a constituent product that is part of an intermediate product bill of material. At step 610, it is determined if there are any more predecessor PSEG's, and if so, the method returns to step 608. If not, the process proceeds to step 612 where the defined iPPM database object is stored in memory, for example, in a master data repository for production master data.

FIG. 6 also shows that the defined iPPM database object may later be used to generate various different production data structures that may be used for various purposes. For example, FIG. 6 shows that the iPPM database object may be used to generate, in step 614, a planning production data structure, for example, the data structure stored in repository 114 shown in FIG. 1B, which may be used to generate a planning-level production order. In addition, the iPPM database object may be used to generate, in step 616, an execution-level production data structure, for example, the data structure stored in repository 114 shown in FIG. 1B, which may be used to generate an execution-level production order.

Figure 7:
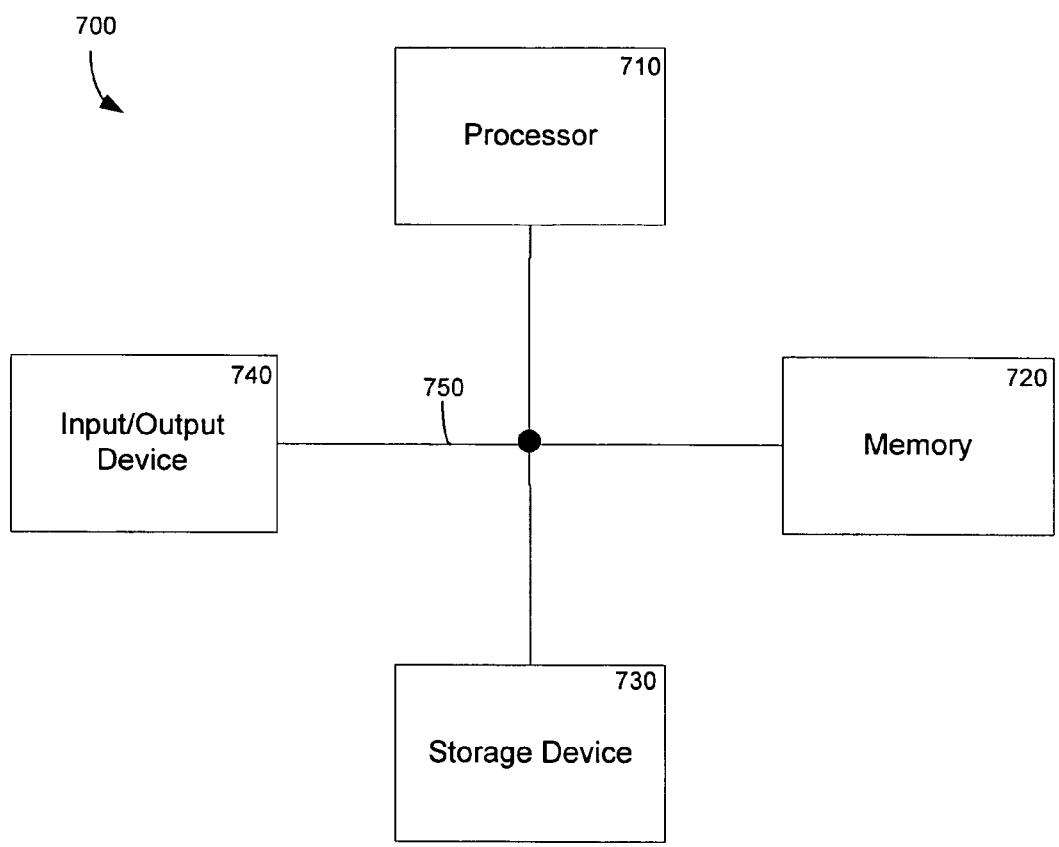
FIG. 7 is a block diagram of a computing system that can be used in connection with the data models and computer-implemented methods described in this document.

FIG. 7 is a schematic diagram of a generic computer system 700. The system 700 can be used for the operations described in association with the methods shown in FIGS. 4 and 6, according to one implementation. For example, the system 700 may be included the master data maintenance component 106 shown in the FIG. 1A-B example, which may in one implementation perform the methods shown in FIGS. 4 and 6.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A manufacturing production and process electronic data model tangibly embodied in a machine-readable storage device, the electronic data model defining a manufacture of a defined end output product, comprising:
   a top-level database object that identifies and provides an overall manufacturing control for a production process for the defined end output product; and
   multiple defined production segment database objects that are each identified by the top-level database object, each represent a portion of the production process, and are linked in a sequence that represents the production process, each linked production segment database object (1) identifying a defined segment output product, (2) including a defined bill of material needed as inputs to produce the defined segment output product, and (3) including a defined routing that describes a sequence of production operations for the defined segment output product, wherein the defined segment output product of a final segment database object in the sequence is the defined end output product and each remaining defined segment output product in the sequence is included in a defined bill of material of a later production segment database object in the sequence.

2. The electronic data model of claim 1, wherein for each defined production segment that is not the one segment for which the defined segment output product is the defined end output product, the defined segment output product is an intermediate product used in a subsequent linked defined production segment.

3. The electronic data model of claim 1, wherein each defined production segment database object corresponds to production tasks for which a separate production order is generated for execution.

4. The electronic data model of claim 1, wherein each of the defined bills of material includes at least one of a defined material item and a defined group of material items.

5. The electronic data model of claim 4, wherein each defined process routing comprises at least one defined production activity.

6. The electronic data model of claim 5, wherein the production segment database object includes a defined link between an item or item group and a routing activity to define the linked item or item group as an input for the routing activity to which the item or item group is linked.

7. The electronic data model of claim 1, wherein the electronic data model is used to generate a production data structure having a form that allows a production order to be generated from the production data structure.

8. The electronic data model of claim 7, wherein the production data structure is an aggregated structure from which a production order is generated that is used for planning the production of a specified quantity of the end output product.

9. The electronic data model of claim 7, wherein the production data structure is a structure from which a production order is generated that is used for executing production of a specified quantity of the end output product.

10. The electronic data model of claim 7, wherein the production data structure comprises a first production data structure and a second production data structure, the first production data structure being an aggregated structure from which a production order is generated that is used for planning the production of a specified quantity of the end output product, and the second production data structure being a structure from which a production order is generated that is used for executing production of a specified quantity of the end output product.

11. A computer-implemented method, tangibly embodied in a machine-readable storage device, for defining a manufacturing production and process electronic data model defining the manufacturing of a defined end output product, the method comprising:
 defining a top-level database object that identifies and provides an overall manufacturing control for a production process for the defined end output product, and a production organization responsible for manufacturing the defined end output product; and
 assigning to the top-level database object multiple defined production segment database objects that each represent a portion of the production process and are linked in a sequence that represents the production process, each segment database object (1) identifying a defined segment output product, (2) including a defined bill of material needed as inputs to produce the segment output product, and (3) including a defined process routing that describes a sequence of production operations for the segment output product, wherein the defined segment output product of a final segment database object in the sequence is the defined end output product and each remaining defined segment output product in the sequence is included in a defined bill of material of a later production segment database object in the sequence.

12. The computer-implemented method of claim 11, wherein the assigning of multiple defined production segment database objects comprises:
 assigning to the top-level database object a first defined production segment database object that has a defined segment output product that is the same as the end output product; and
 assigning to the top-level database object a second defined production segment database object that has a defined segment output product that is the same as an item defined in the bill of material for the first defined production segment database object.

13. The computer-implemented method of claim 12, wherein the assigning of multiple defined production segment database objects further comprises:
 assigning to the top-level database object a third defined production segment that has a defined segment output product that is the same as an item defined in the bill of material for the second defined production segment database object.

14. The computer-implemented method of claim 13, wherein the method further comprises continuing the assignment of additional defined production segment database objects that have a defined segment output product that is the same as an item defined in the bill of material for an already assigned production segment database object.

15. The computer-implemented method of claim 11, wherein each of the defined bills of material includes at least one of a defined material item and a defined group of material items.

16. The computer-implemented method of claim 15, wherein each defined process routing comprises at least one defined production activity.

17. The computer-implemented method of claim 16, wherein the production segment database object includes a defined link between an item or item group and a routing activity to define the linked item or item group as an input for the routing activity to which the item or item group is linked.

18. The computer-implemented method of claim 11, wherein the electronic data model is used to generate a production data structure having a form that allows a production order to be generated from the production data structure.

19. The computer-implemented method of claim 18, wherein the production data structure is an aggregated structure from which a production order is generated that is used for planning the production of a specified quantity of the end output product.

20. The computer-implemented method of claim 18, wherein the production data structure is a structure from which a production order is generated that is used for executing production of a specified quantity of the end output product.

* * * * *